US009819822B2

(12) United States Patent
Saito

(10) Patent No.: US 9,819,822 B2
(45) Date of Patent: Nov. 14, 2017

(54) IMAGE FORMING SYSTEM, IMAGE FORMING APPARATUS, TERMINAL DEVICE AND NON-TRANSITORY COMPUTER-READABLE RECORDING MEDIUM

(71) Applicant: Konica Minolta, Inc., Chiyoda-ku, Tokyo (JP)

(72) Inventor: Shuta Saito, Tachikawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/951,078

(22) Filed: Nov. 24, 2015

(65) Prior Publication Data

US 2016/0182755 A1    Jun. 23, 2016

(30) Foreign Application Priority Data

Dec. 22, 2014    (JP) .................................. 2014-258257

(51) Int. Cl.
G06K 15/02    (2006.01)
G06F 3/12    (2006.01)
(Continued)

(52) U.S. Cl.
CPC ..... *H04N 1/00896* (2013.01); *G06K 15/4055* (2013.01); *H04N 1/00315* (2013.01); *H04N 2201/0094* (2013.01)

(58) Field of Classification Search
None
See application file for complete search history.

(56) References Cited

U.S. PATENT DOCUMENTS 6,119,018 A    9/2000 Kondo
6,907,257 B1 *  6/2005 Mizutani ............... H04W 36/30
                                                370/335
(Continued)

FOREIGN PATENT DOCUMENTS

JP    09-326754    12/1997
JP    2001-196997 A    7/2001
(Continued)

OTHER PUBLICATIONS

Office Action (Notice of Reason for Refusal) dated Feb. 1, 2017 by the Japanese Patent Office in corresponding Japanese Patent Application No. 2014-258257, and English translation of Office Action (12 pages).

*Primary Examiner* — Beniyam Menberu
(74) *Attorney, Agent, or Firm* — Buchanan Ingersoll & Rooney PC

(57) ABSTRACT

Disclosed is an image forming system including: an image forming apparatus comprising a wireless communication unit; and a terminal device for transmitting a print job to the image forming apparatus, wherein the wireless communication unit executes a wave radio intensity setting process in which the wireless communication unit transmits a received signal intensity request at a predetermined radio wave intensity, receives information from the terminal device, which indicates a received signal intensity at a timing of receiving the received signal intensity request, and sets a radio wave intensity of a radio wave to be transmitted by the wireless communication unit to a set value which is lowered within a range in which the image forming apparatus is communicable with the terminal device in which the received signal intensity indicated in the information is lowest, and the image forming apparatus executes the print job received from the terminal device.

22 Claims, 11 Drawing Sheets

(51) Int. Cl.
*H04N 1/00* (2006.01)
*G06K 15/00* (2006.01)

(56) References Cited

U.S. PATENT DOCUMENTS

| | | | |
|---|---|---|---|
| 9,172,834 B2 | 10/2015 | Matsubara | |
| 2001/0014088 A1* | 8/2001 | Johnson | H04L 47/10 370/338 |
| 2005/0101294 A1* | 5/2005 | Yamamoto | H04L 63/0869 455/411 |
| 2005/0261018 A1* | 11/2005 | Yamamoto | H04W 52/242 455/522 |
| 2007/0217368 A1* | 9/2007 | Kurokawa | H04W 52/247 370/335 |
| 2008/0220803 A1* | 9/2008 | Lee | H04W 52/245 455/522 |
| 2008/0268816 A1* | 10/2008 | Wormald | H04W 68/00 455/412.2 |
| 2009/0084964 A1* | 4/2009 | Kito | A61B 6/548 250/370.08 |
| 2009/0247085 A1* | 10/2009 | Misumi | H04W 16/14 455/63.3 |
| 2010/0081474 A1 | 4/2010 | Yoneyama | |
| 2012/0183091 A1* | 7/2012 | Komori | H03K 7/02 375/272 |
| 2013/0039212 A1* | 2/2013 | Li | H04W 52/0245 370/253 |
| 2013/0057898 A1* | 3/2013 | Park | H04L 63/10 358/1.14 |
| 2015/0065187 A1* | 3/2015 | Hyun | H04W 52/245 455/522 |
| 2015/0116753 A1* | 4/2015 | Sato | G06F 3/1238 358/1.14 |
| 2015/0350820 A1* | 12/2015 | Son | H04W 4/008 455/41.2 |
| 2016/0094734 A1* | 3/2016 | Ohashi | H04N 1/00307 358/1.15 |

FOREIGN PATENT DOCUMENTS

| | | |
|---|---|---|
| JP | 2007-281804 | 10/2007 |
| JP | 2008-199099 A | 8/2008 |
| JP | 2010-87915 A | 4/2010 |
| JP | 2011-19173 A | 1/2011 |
| JP | 2014-63404 A | 4/2014 |

* cited by examiner

IMAGE FORMING SYSTEM, IMAGE FORMING APPARATUS, TERMINAL DEVICE AND NON-TRANSITORY COMPUTER-READABLE RECORDING MEDIUM

BACKGROUND OF THE INVENTION

Field of the Invention

The present invention relates to an image forming system comprising an image forming apparatus having a wireless communication unit which functions as an access point, and a terminal device for transmitting a print job to the image forming apparatus; an image forming apparatus and a terminal device which constitute the image forming system; and a non-transitory computer-readable recording medium which stores a program for operating an information processing apparatus as the terminal device.

Description of Related Art

An access point of the wireless communication transmits a signal called as a beacon at intervals of the predetermined period, and notifies each terminal device of the existence of the access point. Because the beacon is always transmitted at intervals of the predetermined period even though the access point is not communicated with the terminal, the electric power is considerably consumed by the access point.

As a technology for saving the power consumption in the access point, for example, the following technology has been proposed. In the technology, the access point judges whether the terminal device which communicates with the access point is a mobile type of device or a stationary type of device, and changes the radio wave intensity of the beacon according to the above judgment result (for example, Japanese Patent Application Publication No. 2007-281804). Because the stationary type of device is not moved, the radio wave intensity is set in accordance with the past communication history. On the other hand, because there is some possibility that the mobile type of device is moved away from the access point, the radio wave intensity is set to the upper limit or the maximum value in the past history.

Further, in order to reduce the power consumption of the terminal device, the base station instructs the mobile terminal to reduce the transmission power (for example, Japanese Patent Application Publication No. H09-326754).

Among the image forming apparatuses, such as a multi function peripheral for forming an image by receiving a print job from the terminal, and the like, the apparatus which has the function as the access point of the wireless communication has been prepared. In general, the image forming apparatus controls the power consumption by changing the power mode to a power saving mode when the standby state in which a job is not executed continues for a predetermined time. In order to receive the job from the terminal device even though the image forming apparatus is operated in the power saving mode, it is necessary to enable the wireless communication function.

However, incase that the wireless communication unit has the function as the access point, it is necessary to repeatedly transmit the beacon as described above. Therefore, it is difficult to control the power consumption.

SUMMARY

To achieve at least one of the abovementioned objects, an image forming system reflecting one aspect of the present invention, comprises:

an image forming apparatus comprising a wireless communication unit which functions as an access point; and a terminal device configured to transmit a print job to the image forming apparatus, wherein the wireless communication unit of the image forming apparatus executes a wave radio intensity setting process in which the wireless communication unit transmits a received signal intensity request at a predetermined radio wave intensity, receives information which is transmitted as a response to the received signal intensity request from each terminal device receiving the received signal intensity request and which indicates a received signal intensity at a timing of receiving the received signal intensity request, and sets a radio wave intensity of a radio wave to be transmitted by the wireless communication unit to a set value which is lowered within a range in which the image forming apparatus is communicable with the terminal device in which the received signal intensity indicated in the information is lowest, and the image forming apparatus executes the print job received from the terminal device.

Preferably, the predetermined radio wave intensity is a maximum radio wave intensity of the radio wave which can be transmitted by the wireless communication unit.

Preferably, the wireless communication unit repeatedly executes the wave radio intensity setting process at a time interval.

Preferably, in case that the set value which is set in the wave radio intensity setting process is less than a predetermined value, the wireless communication unit sets the time interval so as to be shorter than the time interval which is set in case that the set value is not less than the predetermined value.

Preferably, the terminal device comprises a transmission unit configured to transmit an execution instruction for executing the wave radio intensity setting process to the image forming apparatus, and in case that the image forming apparatus receives the execution instruction from the terminal device, the image forming apparatus executes the wave radio intensity setting process.

Preferably, the terminal device monitors the received signal intensity, and in case that the received signal intensity is lower than a predetermined allowable minimum value, the terminal device transmits the execution instruction to the image forming apparatus.

Preferably, in case that the terminal device receives a predetermined operation from a user, the terminal device transmits the execution instruction to the image forming apparatus.

Preferably, the image forming apparatus comprises an instruction receiving unit configured to receive a forced execution instruction for executing the radio wave intensity setting process from a user, and in case that the instruction receiving unit receives the forced execution instruction, the wireless communication unit executes the wave radio intensity setting process.

Preferably, when a reception of the print job is started, the wireless communication unit changes the set value highly according to a data size of the print job, and after the reception of the print job is finished, the wireless communication unit returns the set value to an original value.

Preferably, the image forming apparatus comprises a power saving control unit configured to change a power mode between a normal mode and a power saving mode in which a power consumption is suppressed more than the normal mode, and the wireless communication unit executes the radio wave intensity setting process in the power saving mode, and when the power mode is changed from the power saving mode to the normal mode by receiving the print job, the wireless communication unit changes the set value to the predetermined radio wave intensity or changes the set value highly according to a data size of the print job.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will be explained with reference to the accompanying drawings.

Figure 1:
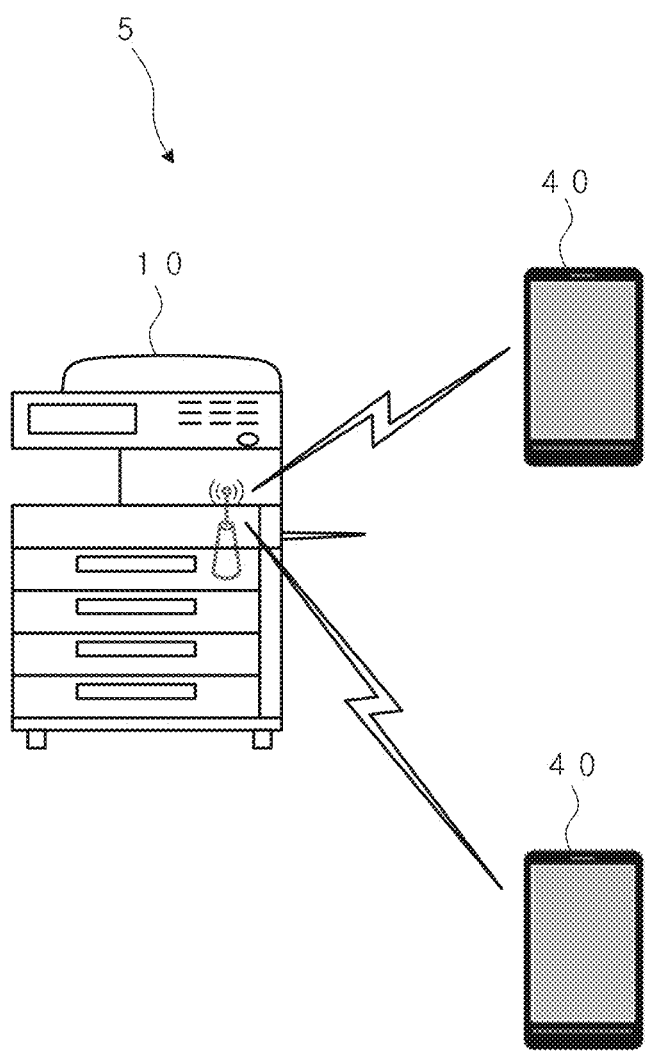
FIG. 1 is a view showing a configuration example of the image forming system according to the embodiment.

FIG. 1 shows a configuration example of the image forming system 5 according to the embodiment. The image forming system 5 comprises an image forming apparatus 10 and at least one terminal device 40 which is communicable with the image forming apparatus 10 via the wireless communication.

The image forming apparatus 10 is a so-called multi function peripheral (MFP) having a copy function for printing out an image on a recording sheet by optically reading an original, a scan function for storing the image data of the read original as a file or transmitting the file to an external terminal via a network, a printer function for printing out an image by forming the image on a recording sheet in accordance with the print job received from a PC (Personal Computer) or the terminal device 40 via the network, a facsimile function for transmitting and receiving image data in compliance with the facsimile protocol, and the like. The image forming apparatus 10 has the function as the access point of the wireless communication.

The terminal device 40 is a portable type of terminal device (mobile terminal) and has the function for transmitting a print job to the image forming apparatus 10 via the wireless communication.

In order to reduce the power consumption required for the image forming apparatus 10 to have the function as the access point, the image forming system 5 has the function for setting the radio wave intensity (referred to as "output radio wave intensity") of the radio wave which is transmitted from the access point, lower within the range in which the image forming apparatus 10 is communicable with the terminal device 40 which is the farthest from the access point in view of the radio wave intensity among the terminal devices 40 which exist in the area in which the access point can be connect.

Figure 2:
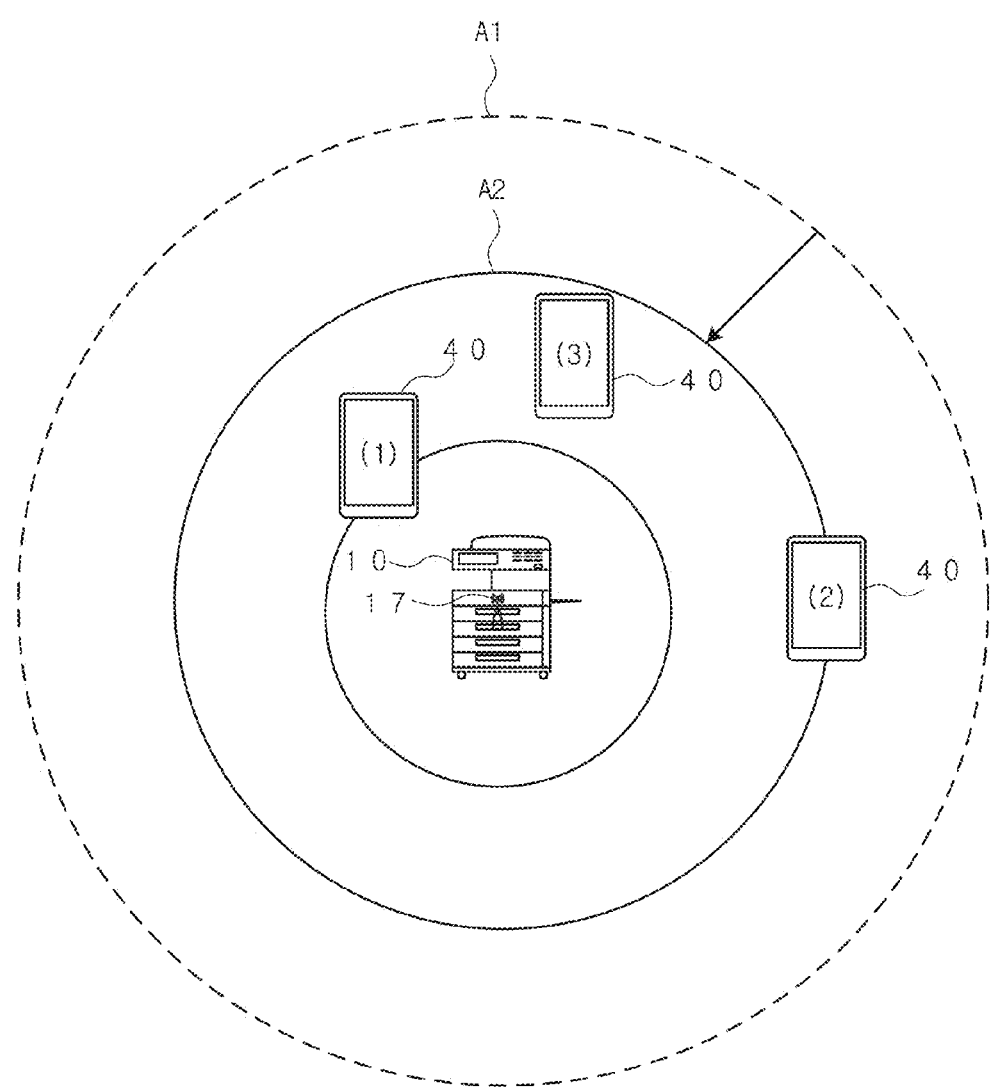
FIG. 2 is a view showing the situation in which the output radio wave intensity is lowered to the suitable value.

For example, as shown in FIG. 2, the communicable range in which the image forming apparatus 10 sets the output radio wave intensity to the maximum value is referred to as the area A1. In the area A1, the terminal device (1), the terminal device (2) and the terminal device (3) exist. Among these terminal devices, the terminal device (2) is positioned the farthest from the image forming apparatus 10 in view of the radio wave intensity. Therefore, the access point included in the image forming apparatus 10 lowers the radio wave intensity within the range in which the communication with the terminal device (2) can be maintained. In case of FIG. 2, when the output radio wave intensity is set the lowest within the range in which the access point is communicable with the terminal device (2), the communicable range becomes the area A2. At this time, in case that the terminal device (2) receives a signal which is transmitted from the access point, the received signal intensity is lowered as compared with the case in which the output radio wave intensity is set to the maximum value. However, the received signal intensity in which the communication can be maintained is secured.

Figure 3:
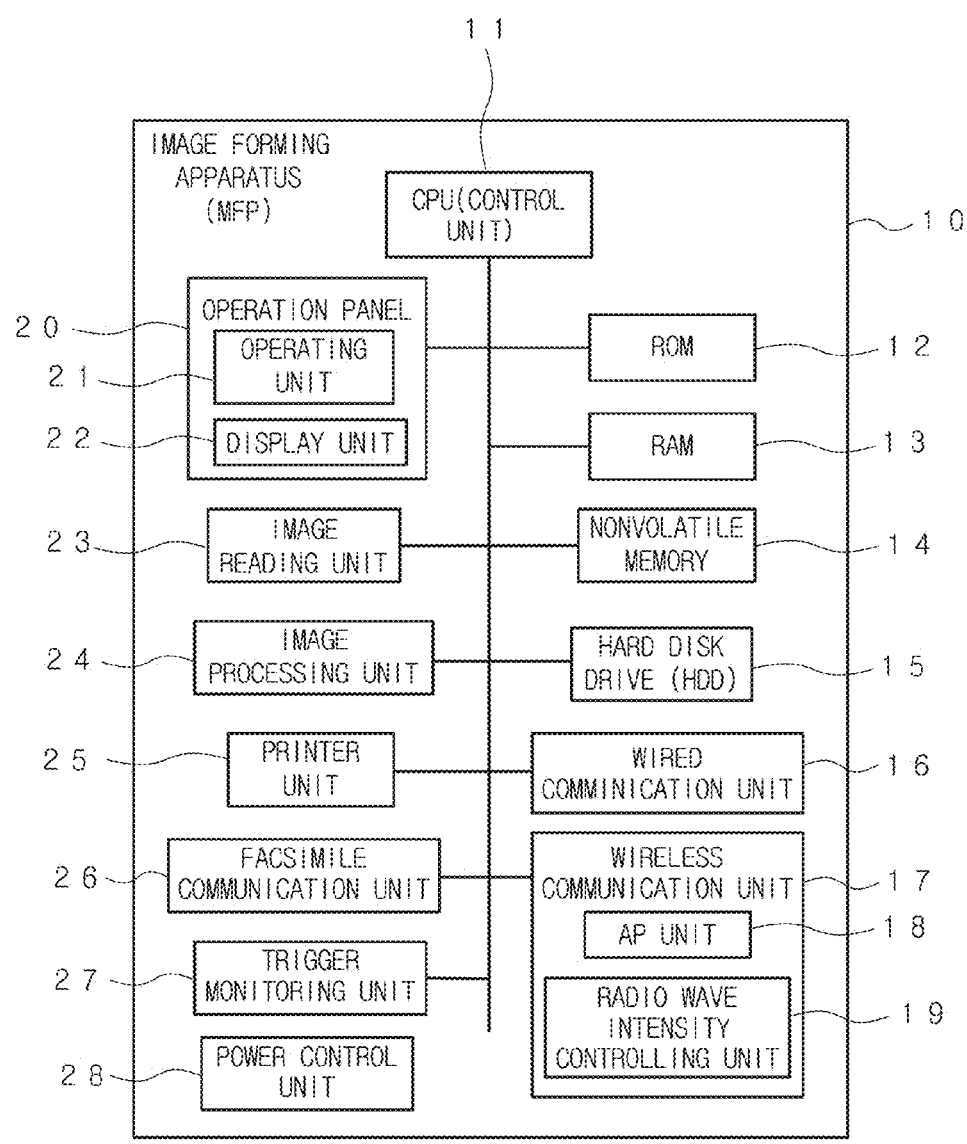
FIG. 3 is a block diagram showing the schematic configuration of the image forming apparatus.

FIG. 3 is a block diagram showing the schematic configuration of the image forming apparatus 10. The image forming apparatus 10 comprises a CPU (Central Processing Unit) 11 as a control unit for entirely controlling the operation of the image forming apparatus 10. The CPU 11 is connected with a ROM (Read Only Memory) 12, a RAM (Random Access Memory) 13, a nonvolatile memory 14, a hard disk drive 15, a wired communication unit 16, a wireless communication unit 17, an operation panel 20, an image reading unit 23, an image processing unit 24, a printer unit 25, a facsimile communication unit 26, a trigger monitoring unit 27 and the like via a bus. Further, the image forming apparatus 10 comprises a power control unit 28 for controlling the power mode of the image forming apparatus 10.

By the CPU 11, a middleware, application programs and the like are executed on an OS (Operating System) program as a base. In the ROM 12, various types of programs are stored. By executing various types of processes by the CPU 11 in accordance with these programs, each function of the image forming apparatus 10 are realized. The program for entirely controlling the image forming apparatus 10 and the program for controlling the setting of the output radio wave intensity may be the separate programs, or may be integrated into one program.

The RAM 13 is used as a work memory for temporarily storing various data when the CPU 11 executes the process in accordance with the programs and as an image memory for storing image data.

The nonvolatile memory 14 is a memory (flash memory) in which the stored contents are not damaged even if the image forming apparatus 10 is turned off, and is used for storing various types of setting information and the like.

The hard disk drive 15 is a large-capacity nonvolatile memory. In the hard disk drive 15, various types of programs and data are stored in addition to the received print data.

The wired communication unit 16 has the function for communicating with various types of external devices via the wired network.

The wireless communication unit 17 has the function for communicating with the terminal device 40 or various types of external devices via the wireless communication. The wireless communication unit 17 comprises the AP unit 18 having the function as the access point and the radio wave intensity controlling unit 19 for setting the output radio wave intensity.

The operation panel 20 comprises an operating unit 21 and a display unit 22. The display unit 22 has the function for displaying various types of operating windows, setting windows and the like. The display unit 22 comprises a liquid crystal display, the driver thereof, and the like. The operating unit 21 has the function for receiving various types of operations from a user. The operating unit 21 comprises various types of hardware keys, such as a start button, a numeric keypad, and the like, a touch screen provided on the display screen of the display unit 22, and the like. The touch screen detects the coordinate position on which the display screen of the display unit 22 is contacted by a touch pen, the user's finger or the like to operate the image forming apparatus 10.

The image reading unit 23 has the function for obtaining the image data by optically reading an original.

The image processing unit 24 executes the rasterization process for converting print data into image data, the compression/decompression process for the image data in addition to the processings, such as the enlargement/reduction and the rotation of image data.

The printer unit 25 has the function as the image forming unit for forming an image on the recording sheet in accordance with the image data. In this embodiment, the printer unit 25 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer.

The facsimile communication unit 26 has the function for transmitting and receiving the image data to/from an external device having the facsimile function via a telephone line.

The power control unit 28 changes the power mode of the image forming apparatus 10 between the normal mode in which the print job and the like can be executed and the power saving mode in which the power consumption is suppressed more than the normal mode. In the power saving mode, supplying the electric power to the most part of the image forming apparatus 10 is stopped. However, even in the power saving mode, the electric power is supplied to the wireless communication unit 17 and the trigger monitoring unit 27.

The trigger monitoring unit 27 detects the event (trigger) which causes the power mode to return from the power saving mode to the normal mode. For example, the trigger monitoring unit 27 detects the specific event, such as the reception of the print job, the operation to the specific switch of the operation panel 20, or the like, as the trigger for changing the power mode from the power saving mode to the normal mode. The trigger monitoring unit 27 comprises a sensor, a circuit for monitoring the sensor, and the like.

Figure 4:
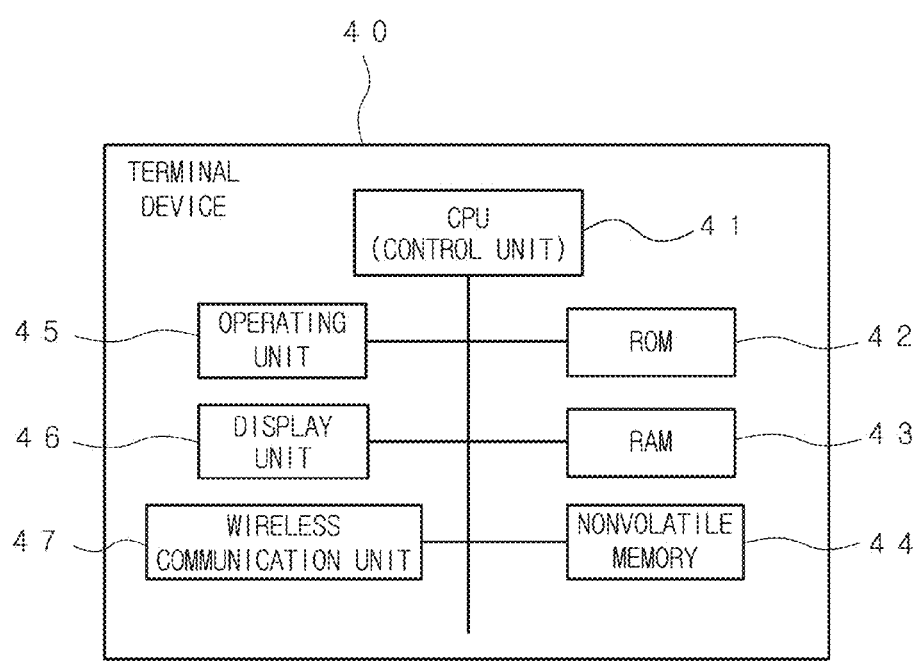
FIG. 4 is a block diagram showing the schematic configuration of the terminal device.

FIG. 4 is a block diagram showing the schematic diagram of the terminal device 40. The terminal device 40 comprises a CPU 41 for entirely controlling the operation of the terminal device 40. The CPU 41 is connected with a ROM 42, a RAM 43, a nonvolatile memory 44, an operating unit 45, a display unit 46, a wireless communication unit 47 and the like via a bus.

The CPU 41 controls the operation of the terminal device 40 in accordance with the programs stored in the ROM 42. In the ROM 42, the programs and the fixed data are stored. The RAM 43 is used as a work memory for temporarily storing various data when the CPU 41 executes the process in accordance with the programs. In the nonvolatile memory 44, various types of setting information are stored.

The display unit 46 is a liquid crystal display or the like. The operating unit 45 comprises some hardware switches, a touch screen provided on the display surface of the display unit 46, and the like.

The wireless communication unit 47 has the function for communicating with the image forming apparatus 10 or various types of external devices via the wireless communication.

Figure 5:
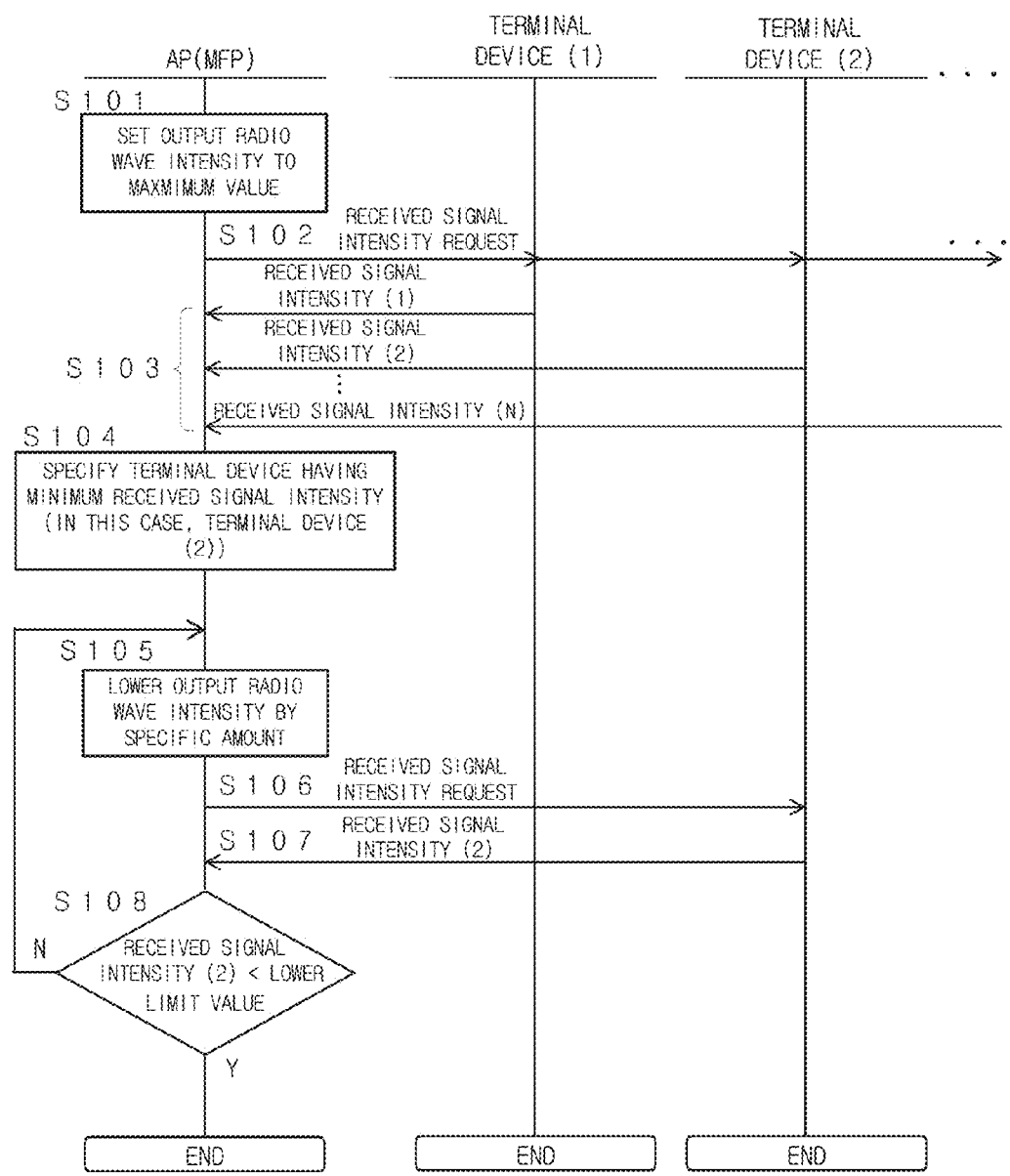
FIG. 5 is a flowchart showing the radio wave intensity setting process which is executed by the wireless communication unit of the image forming apparatus.

FIG. 5 shows the flow of the radio wave intensity setting process which is executed by the radio wave intensity controlling unit 19 of the wireless communication unit 17 of the image forming apparatus 10. Firstly, the radio wave intensity controlling unit 19 of the wireless communication unit 17 sets the set value of the output radio wave intensity to the maximum value (S101). Then, the radio wave intensity controlling unit 19 transmits the received signal intensity request to each terminal device 40 at the maximum output radio wave intensity (S102). In the example of FIG. 2, the received signal intensity request is transmitted within the range of the area A1.

Each terminal device 40 which receives the received signal intensity request from the image forming apparatus 10, transmits the received signal intensity information indicating the received signal intensity at the timing of receiving the received signal intensity request, to the image forming apparatus 10. The wireless communication unit 17 of the image forming apparatus 10 receives the received signal intensity information which is transmitted from each terminal device 40 receiving the received signal intensity request (S103), and the radio wave intensity controlling unit 19 controls the output radio wave intensity so as to lower the output radio wave intensity within the range in which the image forming apparatus 10 is communicable with the terminal device 40 in which the received signal intensity indicated in the received signal intensity information is the lowest.

In detail, the image forming apparatus 10 specifies the terminal device 40 having the lowest received signal intensity among the terminal devices 40 which transmit the received signal intensity information (S104). In this case, by exemplifying the situation shown in FIG. 2, the terminal device (2) is treated as the terminal device having the lowest received signal intensity.

Next, the output radio wave intensity is lowered by the specific amount (S105), and the radio wave intensity controlling unit 19 transmits the received signal intensity request to the terminal device (2) specified in S104 again (S106). Then, the wireless communication unit 17 receives the received signal intensity information from the terminal device (2) (S107).

In case that the received signal intensity indicated in the received signal intensity information received in S107 (in the example of FIG. 5, the received signal intensity of the terminal device (2)) is not less than the predetermined lower limit value of the received signal intensity (S108; N), the process is continued by returning to S105. In case that the received signal intensity indicated in the received signal intensity information received in S107 is less than the lower limit value of the received signal intensity (S108; Y), the process is ended. The output radio wave intensity which is set at the ending of the process is the set value (optimal value) of the output radio wave intensity, which is obtained in case that output radio wave intensity is set the lowest within the range in which the image forming apparatus 10 is communicable with the terminal device (2) having the lowest received signal intensity, which is specified in S104. In the example of FIG. 2, the communicable range becomes the area A2 shown in FIG. 2.

In the example of FIG. 5, the image forming apparatus 10 specifies the terminal device having the lowest received signal intensity in S104, and the steps S105 to S108 are executed by using the specified terminal device. However, it is not required to specify the terminal device having the lowest received signal intensity. That is, the step S104 is skipped, and in S106, the received signal intensity request is transmitted to all of the terminal devices. Then, in S107, the received signal intensity information is received from each terminal device, and in S108, the lowest value which is the lowest among the received signal intensities indicated in the received signal intensity information received in S107, is compared with the predetermined lower limit value of the received signal intensity. In case that the above lowest value is not less than the predetermined lower limit value of the received signal intensity, the process is continued by returning to S105. In case that the above lowest value is less than the predetermined lower limit value, the output radio wave intensity which is currently set is set to the set value of the output radio wave intensity. Then, the process is ended.

Figure 6:
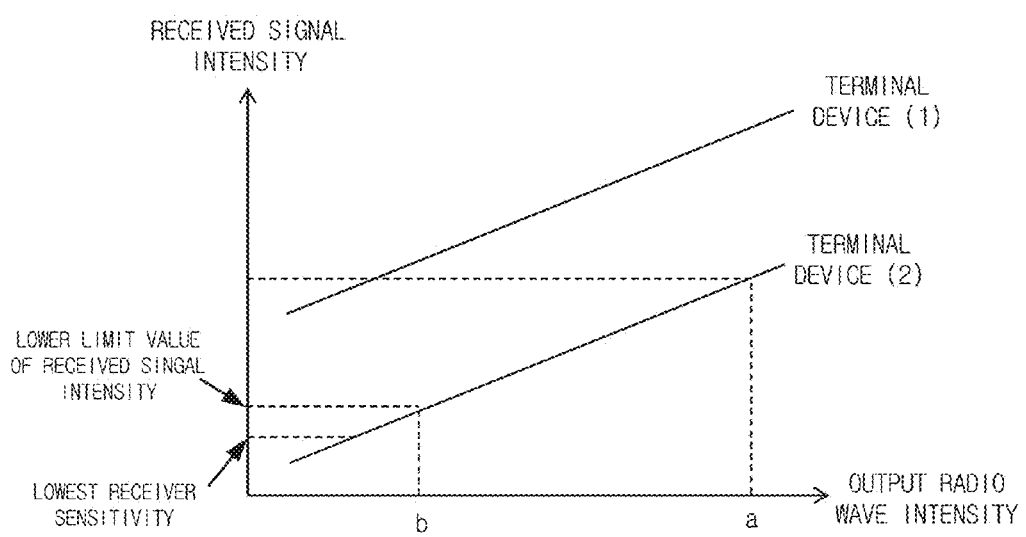
FIG. 6 is a view showing the relation between the output radio wave intensity of the wireless communication unit and the received signal intensity, the lower limit value of the received signal intensity and the lowest receiver sensitivity.

FIG. 6 shows the relation between the output radio wave intensity and the received signal intensity, the lower limit value of the received signal intensity and the lowest receiver sensitivity. It is assumed that the terminal device (2) has the lowest received signal intensity among the terminal devices which can be connected when the output radio wave intensity is the maximum (in the drawing, "a"). The radio wave intensity controlling unit 19 uses the value having the margin with respect to the lowest receiver sensitivity of the terminal device (2), as the lower limit value of the received signal intensity.

In the process shown in FIG. 5, every when the radio wave intensity controlling unit 19 lowers the output radio wave intensity by the predetermined amount, the received signal intensity of the terminal device (2) is checked. Then, when the received signal intensity of the terminal device (2) is less than the lower limit value of the received signal intensity, the process is ended and the set value ("b" in FIG. 6) of the output radio wave intensity is determined.

The lowest receiver sensitivity is different from terminal devices. However, in many cases, because the lowest receiver sensitivity of each terminal device is lower than the lowest receiver sensitivity defined in IEEE802.11 of the wireless communication standard, the radio wave intensity controlling unit 19 may use the lowest receiver sensitivity defined in IEEE802.11, as the above lower limit value.

In case that the radio wave intensity setting process is executed only once and the set value determined by the radio wave intensity setting process is maintained for a long time, there is some possibility that the communication is disconnected when the terminal device (2) is moved further away from the image forming apparatus 10. Further, in case of FIG. 2, even though a new terminal device 40 exists out of the area A2 but within the area A1, the communication with the new terminal device 40 cannot be established.

Therefore, the radio wave intensity controlling unit 19 of the wireless communication unit 17 of the image forming apparatus 10 executes the radio wave intensity setting process repeatedly at the intervals of the optional period or at the intervals of the predetermined period. Hereinafter, the above interval is referred to as the reset period.

When the set value of the output radio wave intensity becomes lower, the communicable range is narrowed. Therefore, there is a high possibility that in case of the maximum output radio wave intensity, the new terminal device exists in the communicable range, but in case of the current set value of the output radio wave intensity, the new terminal device exists out of the communicable range and the new terminal device cannot be detected. In order to surely detect the new terminal device, when the set value of the output radio wave intensity is low, the above reset period is shortened. In this embodiment, in case that the set value of the output radio wave intensity, which is determined by the radio wave intensity setting process, is less than the predetermined reference value (for example, "c" in FIG. 7), the reset period is shortened as compared with the case in which the set value of the output radio wave intensity is not less than the predetermined reference value.

Figure 7:
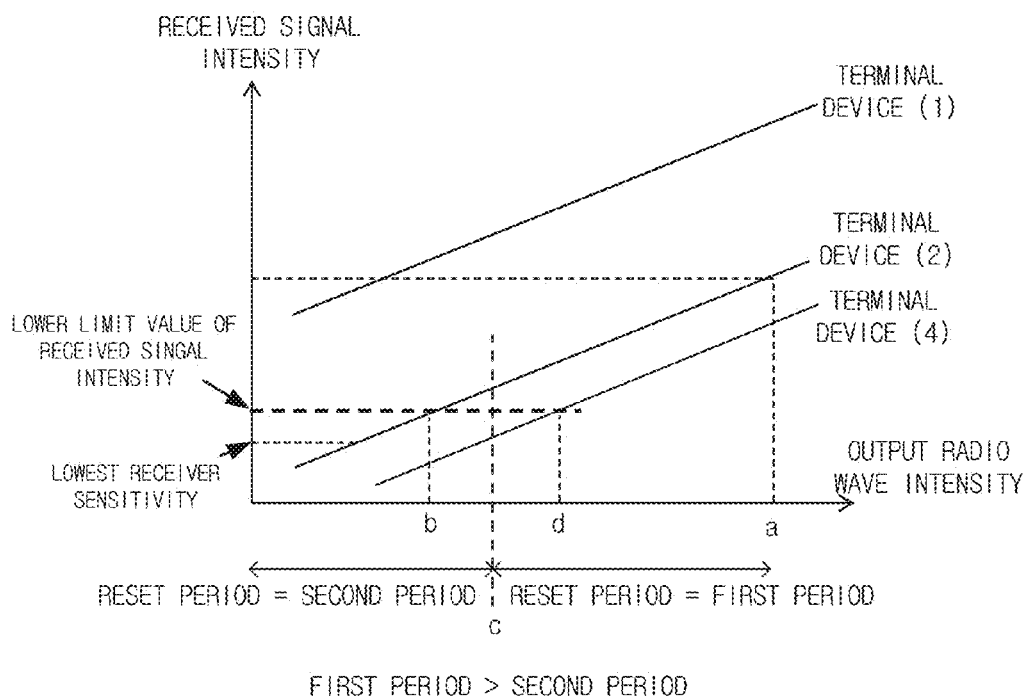
FIG. 7 is a view showing the relation between the reference value relating to the set value of the output radio wave intensity and the reset period.

In case of FIG. 7, when the terminal device having the lowest received signal intensity is the terminal device (4), because the set value of the output radio wave intensity is d which is more than the reference value c, the reset period is set to the first period. When the terminal device having the lowest received signal intensity is the terminal device (2), because the set value of the output radio wave intensity is b which is less than the reference value c, the reset period is set to the second period (first period>second period).

Further, the image forming apparatus 10 has the function for resetting the output radio wave intensity by executing the radio wave intensity setting process when the predetermined operation is received from a user via the operation panel 20, and the function for resetting the output radio wave intensity by executing the radio wave intensity setting process according to the request from the terminal device 40. The resetting of the output radio wave intensity by executing the radio wave intensity setting process is referred to as the radio wave intensity resetting.

Figure 8:
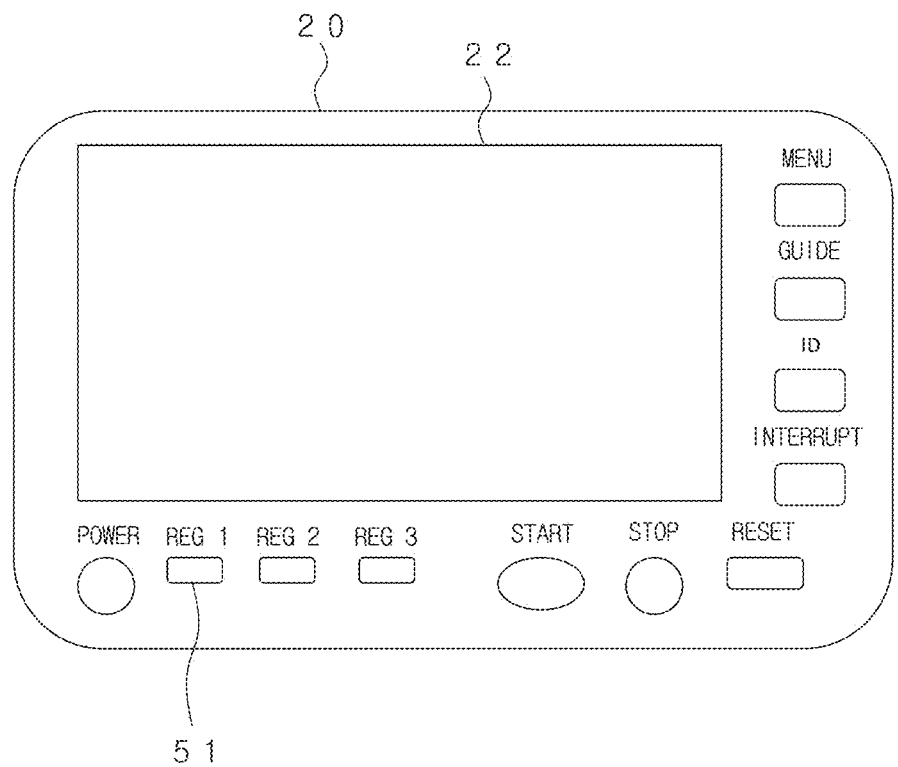
FIG. 8 is a view showing an example of the operating screen in the display unit of the operation panel of the image forming apparatus.

FIG. 8 is an example of the operation panel 20 of the image forming apparatus 10. On the display surface of the operation panel 20, the touch screen is provided. Around the display unit 22, hardware keys are arranged. The first registration button (REG 1), the second registration button (REG 2) and the third registration button (REG 3) are operation buttons to which a user can assign optional functions. For example, in case that the function for requesting the forced execution of the radio wave intensity resetting is assigned to the first registration button 51, when the first registration button 51 is pressed down, the image forming apparatus 10 executes the radio wave intensity resetting.

For example, the first registration button 51 is used in the following method. In case that the position of the user A is within the communicable range which is set when the output radio wave intensity is maximum, but is not within the communicable range which is set in the current output radio wave intensity, the user A requests the user B who is near the image forming apparatus 10 to press down the first registration button 51, for example, by raising a loud voice. When the user B who receives this request presses down the first registration button 51, the image forming apparatus 10 executes the radio wave intensity resetting. Thereby, the user A instructs the image forming apparatus 10 to detect the user A's terminal device 40 to establish the communication with the image forming apparatus 10.

The terminal device 40 has the function for requesting the image forming apparatus 10 to reset the output radio wave intensity in case that the predetermined operation is received from the user, and the function for monitoring the received signal intensity and for requesting the image forming apparatus 10 to reset the output radio wave intensity in case that the received signal intensity is lower than the predetermined allowable minimum value (for example, the lower limit value of the received signal intensity) (The above requests are referred to as the radio wave intensity resetting request).

Figure 9:
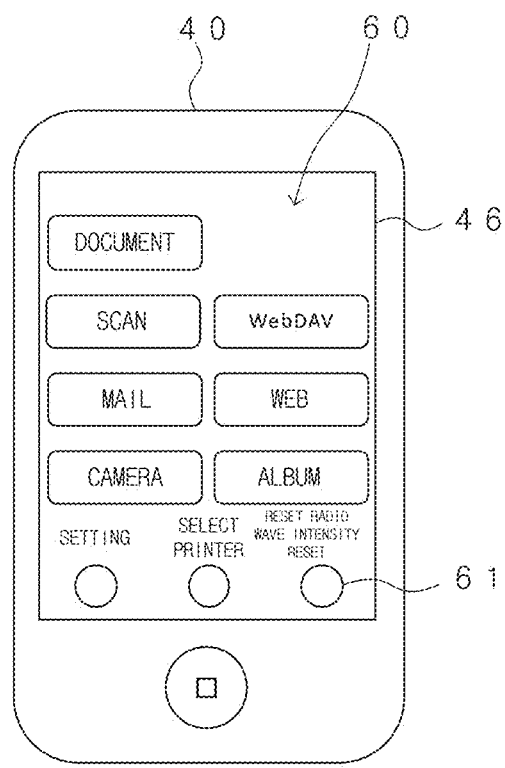
FIG. 9 is a view showing an example of operating screen in the terminal device.

In the terminal device 40, the predetermined program for controlling the transmission of the radio wave intensity resetting request is executed. For example, the program is a part of the program for transmitting a print job to the image forming apparatus 10. For example, the terminal device 40 which is operated by the program displays the operation window 60 shown in FIG. 9 on the display unit 46. When the terminal device 40 receives the operation for the radio wave intensity reset button 61 from the user, the terminal device 40 transmits the radio wave intensity resetting request to the image forming apparatus 10 via the wireless communication.

The terminal device 40 which is operated by the above program, executes the process for monitoring the received signal intensity in the background. In case that the received signal intensity is lower than the predetermined allowable minimum value, the terminal device 40 transmits the radio wave intensity resetting request to the image forming apparatus 10 via the wireless communication. The allowable minimum value is set so as to transmit the radio wave intensity resetting request in the situation in which the terminal device 40 is communicable with the image forming apparatus 10, specifically, in the situation in which the communication in which the communication party is specified can be carried out, that is, in the situation in which the session is established. Therefore, the output radio wave intensity of the image forming apparatus 10 is reset before the session is shut off, and the received signal intensity becomes the allowable minimum value or more.

Figure 10:
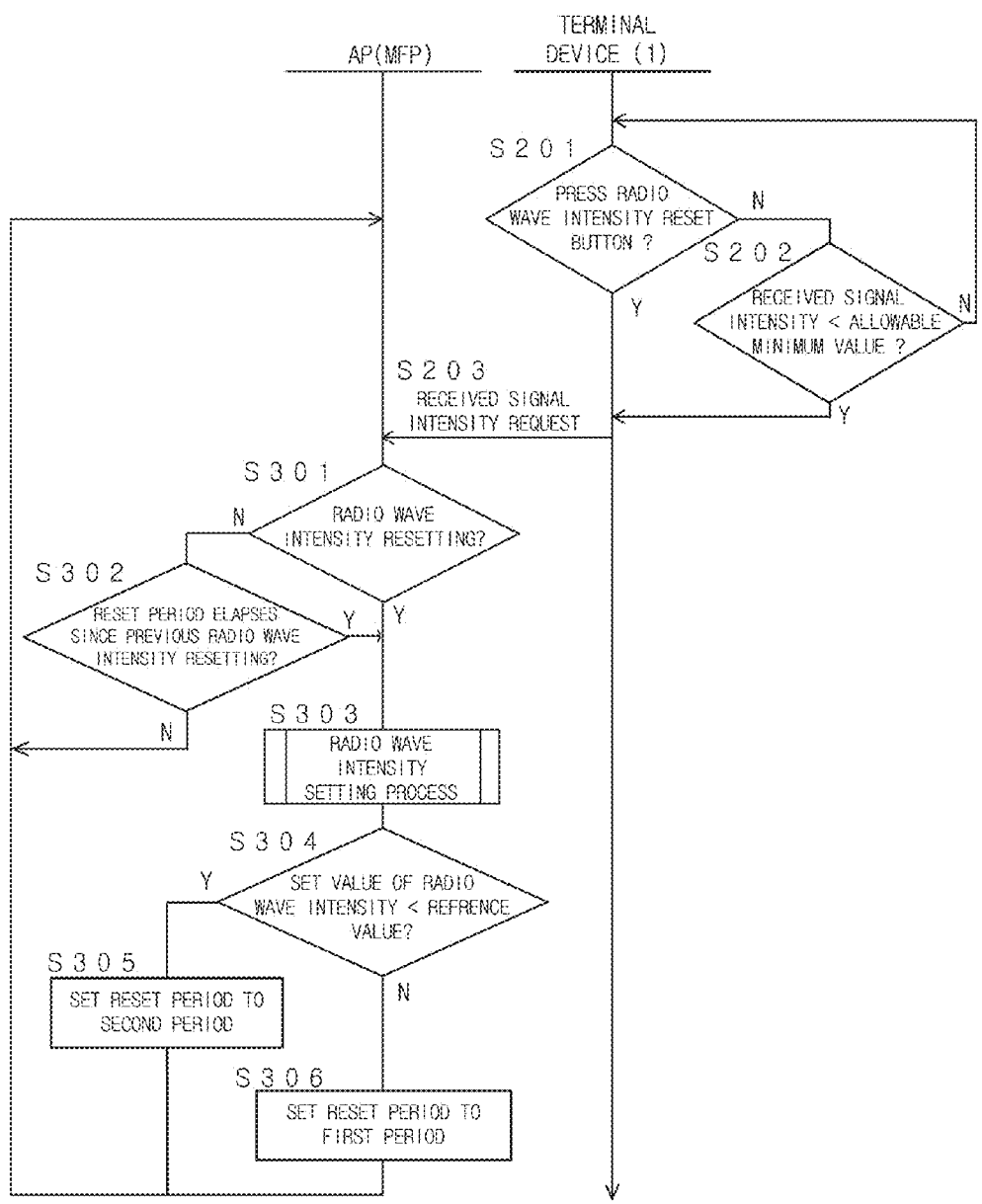
FIG. 10 is a flowchart showing the process for managing the execution of the radio wave intensity setting process.

FIG. 10 shows the flow of the process for managing the execution of the radio wave intensity setting process. When the terminal device 40 receives the operation for the radio wave intensity reset button 61 (S201; Y) or when the monitored received signal intensity is lower than the allowable minimum value (S202; Y), the terminal device 40 transmits the radio wave intensity resetting request to the image forming apparatus 10 (S203).

The image forming apparatus 10 repeatedly executes the following process. When the image forming apparatus 10 receives the radio wave intensity resetting request from the terminal device 40 or when the image forming apparatus 10 receives the forced execution instruction of the radio wave intensity resetting from the user by pressing down the first registration button 51 or the like of the operation panel 20 (S301; Y), alternatively when the reset period elapses since the execution of the previous radio wave intensity resetting (S302; Y), the image forming apparatus 10 executes the radio wave intensity setting process shown in FIG. 2 and resets the radio wave intensity (S303).

The set value of the output radio wave intensity, which is reset by the radio wave intensity resetting, is compared with the reference value ("c" in FIG. 7). In case that the set value of the output radio wave intensity is less than the reference value (S304; Y), the reset period is set to the second period (S305). Then, the process returns to S301. In case that the set value of the output radio wave intensity is not less than the reference value (S304; N), the reset period is set to the first period which is longer than the second period (S306). Then, the process returns to S301.

Next, the control for setting the output radio wave intensity in the power saving mode, will be explained.

Figure 11:
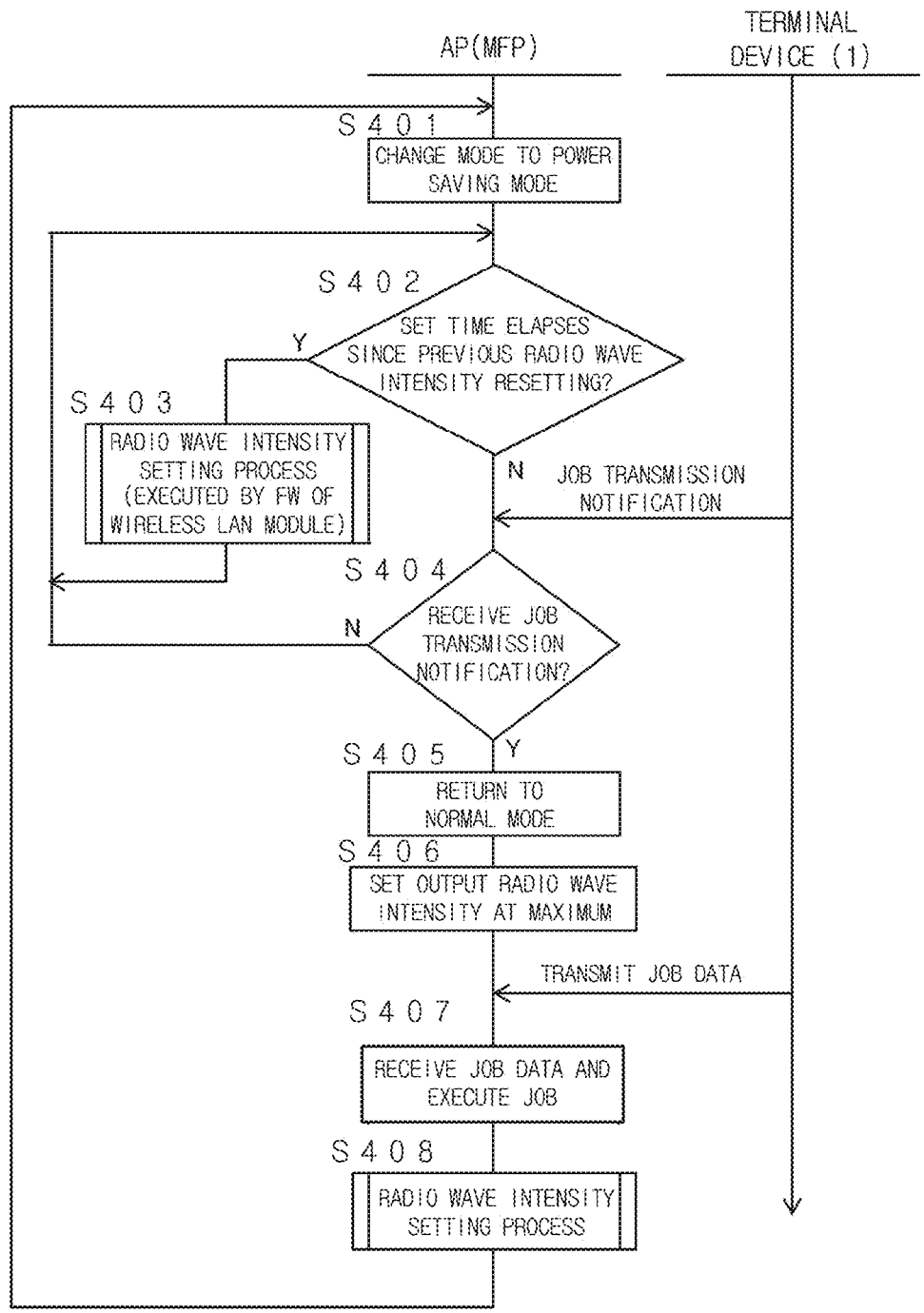
FIG. 11 is a flowchart showing the process for controlling the output radio wave intensity in the power saving mode.

FIG. 11 shows the flow of the process for controlling the output radio wave intensity in the power saving mode, such as the Deep Sleep mode, the ErP mode or the like. In the power saving mode, the electric power is not supplied to the CPU 11, the RAM 13, the hard disk drive 15, the operation panel 20 and the like. On the other hand, the electric power is supplied to only the module relating to the factor for returning from the power saving mode, such as the wireless communication unit 17, the trigger monitoring unit 27 and the like.

After the image forming apparatus 10 changes the power mode to the power saving mode (S401), the image forming apparatus 10 monitors the time which elapses since the previous radio wave intensity resetting (S402). At the predetermined interval (in this case, the reset period) (S402; Y), the image forming apparatus 10 resets the output radio wave intensity by executing the radio wave intensity setting process shown in FIG. 5 (S403). In the power saving mode, the CPU 11 is not operated. However, by using the CPU integrated in the wireless communication unit 17, the radio wave intensity setting process shown in FIG. 5 is executed.

When the image forming apparatus 10 receives the notification indicating the job transmission from the terminal device 40 in the power saving mode (S404; Y), the power mode returns from the power saving mode to the normal mode (S405). As a method for returning to the normal mode, the wireless communication unit 17 which receives the notification indicating the job transmission transmits the control signal for waking up the CPU 11 to the CPU 11, and then the CPU 11 starts the process for returning to the normal mode by receiving the control signal. The above job is a print job or the like.

After the power mode returns to the normal mode, the image forming apparatus 10 sets the output radio wave intensity to the maximum value (S406). Then, the image forming apparatus 10 receives the job data and executes the job (S407). Because the communication speed is proportional to the radio wave intensity, the time required for receiving the job data is shortened by setting the output radio wave intensity to the maximum value. That is, in general, in the terminal device 40, when the received signal intensity is high, it is judged that the quality of the communication with the communication party is high, and then the terminal device 40 executes the process for heightening the data transmission speed.

When the execution of the received job is finished, the image forming apparatus 10 resets the output radio wave intensity by executing the radio wave intensity setting process shown in FIG. 5 (S408). Then, the process returns to S401, and the image forming apparatus 10 returns to the power saving mode again.

In FIG. 11, in S406, the output radio wave intensity is set to the maximum value. However, the output radio wave intensity may be set according to the size of the received job data. In detail, in the notification indicating the job transmission, the information indicating the data size of the job to be transmitted is included. Then, the output radio wave intensity is highly set when the data size indicated in the information is large.

Further, in the power mode except the power saving mode, the output radio wave intensity may be temporarily set to the maximum value according to the reception of the print job, or the radio wave intensity may be strengthened according to the data size of the received print job.

In the normal mode, the output radio wave intensity may be set to the maximum value, and only in the power saving mode, the radio wave intensity setting process may be executed.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the radio wave intensity setting process shown in FIG. 5 of the embodiment, the output radio wave intensity is lowered by the specific amount. However, for example, the relation between the received signal intensity and the set value of the output radio wave intensity may be previously stored in the table, and the table may be referred by using the minimum received signal intensity among the received signal intensities indicated in the information received from the terminal devices. Then, the value obtained by referring the table may be adopted as the set value of the output radio wave intensity. Further, the set value to be registered in the table may be calculated by adding the predetermined margin to the original set value, and after the output radio wave intensity is instantly lowered to the output radio wave intensity indicated by the set value obtained from the table, the process may be executed from S106 shown in FIG. 5. Then, by lowering the output radio wave intensity by the specific amount, the optimum output radio wave intensity may be calculated.

In the embodiment, in the radio wave intensity setting process, when the received signal intensity request is transmitted at the first time, the output radio wave intensity is set to the maximum value. However, it is not necessary to set the output radio wave intensity to the maximum value. For example, the upper limit value of the required output radio wave intensity may be set according to the size of the room in which the image forming apparatus 10 is installed, and the above upper limit may be used as the initial output radio wave intensity.

Regardless of the power saving mode or the normal mode, the radio wave intensity setting process may be executed by the CPU (radio wave intensity controlling unit 19) for controlling the wireless communication unit 17. Alternatively, in the power saving mode, the CPU for controlling the wireless communication unit 17 may execute the radio wave intensity setting process, and in the normal mode, the CPU 11 may execute the radio wave intensity setting process.

In the embodiment, in case that the received signal intensity is lower than the allowable minimum value, the terminal device 40 transmits the radio wave intensity resetting request. However, a simple request for strengthening the output radio wave intensity may be transmitted. For example, the image forming apparatus 10 which receives this request strengthens the output radio wave intensity by the predetermined amount instead of the execution of the radio wave intensity setting process.

In the embodiment, the reset period is changed to one of the first period and the second period. According to the set value of the output radio wave intensity, the reset period may be changed at three or more stages.

One of the objects of the above embodiment is to provide an image forming system, an image forming apparatus, a terminal device and a non-transitory computer-readable recording medium which can realize the function of the access point while the power consumption is suppressed.

In this embodiment, the output radio wave intensity of the access point is set to the output radio wave intensity which is lowered within the range in which the image forming apparatus is communicable with the terminal device which is the farthest from the access point in view of the radio wave intensity among the terminal devices which exist in the area in which the access point can be connect.

In this embodiment, the output radio wave intensity of the access point is set to the output radio wave intensity which is lowered within the range in which the image forming apparatus is communicable with the terminal device which is the farthest from the access point in view of the radio wave intensity among the terminal devices which exist in the area in which the image forming apparatus is communicable with the terminal device at the maximum radio wave intensity.

In this embodiment, by executing the radio wave intensity setting process again, a new terminal device which exists out of the communicable range which is determined by the current radio wave intensity can be detected.

In this embodiment, because when the radio wave intensity is low, the communication range is narrowed, there is some possibility that the new terminal device is not detected. Therefore, the radio wave intensity setting process is executed again at a short time interval.

In this embodiment, the terminal device can request the image forming apparatus to execute the radio wave intensity setting process.

In this embodiment, the terminal device monitors the received signal intensity. When the received signal intensity is lower than the predetermined allowable minimum value, the terminal device requests the image forming apparatus to execute the radio wave intensity setting process.

In this embodiment, when the terminal device receives the predetermined operation from a user, the terminal device requests the image forming apparatus to execute the radio wave intensity setting process.

In this embodiment, when the image forming apparatus receives the instruction from a user, the image forming apparatus executes the radio wave intensity setting process.

In this embodiment, by strengthening radio wave intensity according to the data size of the print job, the time required for receiving the data is shortened.

In this embodiment, in the power saving mode, when the print job is received, the radio wave intensity is set to the maximum value or the radio wave intensity is strengthened according to the data size of the data to be received. When the reception of the print job is finished, the radio wave intensity is set to the original intensity.

In this embodiment, the terminal device has the function for transmitting the print job to the image forming apparatus and the function for transmitting the information indicating the received signal intensity at the timing of receiving the received signal intensity request, to the image forming apparatus in case that the terminal device receives the received signal intensity request from the image forming apparatus.

In this embodiment, the program causes the information processing apparatus to operate so as to have the function for transmitting the print job to the image forming apparatus and the function for transmitting the information indicating the received signal intensity at the timing of receiving the received signal intensity request, to the image forming apparatus in case that the information processing apparatus receives the received signal intensity request from the image forming apparatus.

According to the image forming system, the image forming apparatus, the terminal device and the non-transitory computer-readable recording medium, it is possible to realize the function of the access point while the power consumption is suppressed.

The present U.S. patent application claims the priority of Japanese Patent Application No. 2014-258257, filed on Dec. 22, 2014, according to the Paris Convention, and the entirety of which is incorporated herein by reference for correction of incorrect translation.

What is claimed is:

1. An image forming system, comprising:
an image forming apparatus comprising a wireless communication unit which functions as an access point, the wireless communication unit communicating with a plurality of terminal devices; and
a terminal device configured to transmit a print job to the image forming apparatus,
wherein the wireless communication unit of the image forming apparatus executes a wave radio intensity setting process in which the wireless communication unit transmits a received signal intensity request at a predetermined radio wave intensity, receives information which is transmitted as a response to the received signal intensity request from each terminal device of the plurality of terminal devices receiving the received signal intensity request and which indicates a received signal intensity at a timing of receiving the received signal intensity request, and sets a radio wave intensity of a radio wave to be transmitted by the wireless communication unit to a set value which is lowered within a range in which the image forming apparatus is communicable with one terminal device out of the plurality of terminal devices in which the received signal intensity indicated in the information is lowest, and
the image forming apparatus executes the print job received from the terminal device, wherein the wireless communication unit repeatedly executes the wave radio intensity setting process at a time interval, and
in case that the set value which is set in the wave radio intensity setting process is less than a predetermined value, the wireless communication unit sets the time interval so as to be shorter than the time interval which is set in case that the set value is not less than the predetermined value.

2. The image forming system of claim 1, wherein the predetermined radio wave intensity is a maximum radio wave intensity of the radio wave which can be transmitted by the wireless communication unit.

3. The image forming system of claim 1, wherein the terminal device is configured to transmit an execution instruction for executing the wave radio intensity setting process to the image forming apparatus, and in case that the image forming apparatus receives the execution instruction from the terminal device, the image forming apparatus executes the wave radio intensity setting process.

4. The image forming system of claim 3, wherein the terminal device monitors the received signal intensity, and in case that the received signal intensity is lower than a predetermined allowable minimum value, the terminal device transmits the execution instruction to the image forming apparatus.

5. The image forming system of claim 3, wherein in case that the terminal device receives a predetermined operation from a user, the terminal device transmits the execution instruction to the image forming apparatus.

6. The image forming system of claim 1, wherein the image forming apparatus comprises an operation panel configured to receive a forced execution instruction for executing the radio wave intensity setting process from a user, and in case that the operation panel receives the forced execution instruction, the wireless communication unit executes the wave radio intensity setting process.

7. The image forming system of claim 1, wherein when a reception of the print job is started, the wireless communication unit changes the set value according to a data size of the print job, and after the reception of the print job is finished, the wireless communication unit returns the set value to an original value.

8. The image forming system of claim 1, wherein the image forming apparatus comprises a power saving controller configured to change a power mode between a normal mode and a power saving mode in which a power consumption is suppressed more than the normal mode, and the wireless communication unit executes the radio wave intensity setting process in the power saving mode, and when the power mode is changed from the power saving mode to the normal mode by receiving the print job, the wireless communication unit changes the set value to the predetermined radio wave intensity or changes the set value according to a data size of the print job.

9. An image forming apparatus, comprising:
a wireless communication unit which functions as an access point, the wireless communication unit communicating with a plurality of external terminal devices; and
a printer configured to execute a print job received by the wireless communication unit from an external terminal device of the plurality of external terminal devices,
wherein the wireless communication unit executes a wave radio intensity setting process in which the wireless communication unit transmits a received signal intensity request at a predetermined radio wave intensity, receives information which is transmitted as a response to the received signal intensity request from each external terminal device of the plurality of external terminal devices receiving the received signal intensity request and which indicates a received signal intensity at a timing of receiving the received signal intensity request, and sets a radio wave intensity of a radio wave to be transmitted by the wireless communication unit to a set value which is lowered within a range in which the image forming apparatus is communicable with one terminal device of the plurality of external terminal devices in which the received signal intensity indicated in the information is lowest, wherein the wireless communication unit repeatedly executes the wave radio intensity setting process at a time interval, and in case that the set value which is set in the wave radio intensity setting process is less than a predetermined value, the wireless communication unit sets the time interval so as to be shorter than the time interval which is set in case that the set value is not less than the predetermined value.

10. The image forming apparatus of claim 9, wherein the predetermined radio wave intensity is a maximum radio wave intensity of the radio wave which can be transmitted by the wireless communication unit.

11. The image forming apparatus of claim 9, wherein in case that the wireless communication unit receives an execution instruction for executing the wave radio intensity setting process from the external terminal device, the wireless communication unit executes the wave radio intensity setting process.

12. The image forming apparatus of claim 11, wherein in case that the wireless communication unit receives the execution instruction from the external terminal device which transmits the execution instruction when the monitored received signal intensity is lower than a predetermined allowable minimum value, the wireless communication unit executes the wave radio intensity setting process.

13. The image forming apparatus of claim 11, wherein in case that the wireless communication unit receives the execution instruction from the external terminal device which transmits the execution instruction by receiving an operation from a user, the wireless communication unit executes the wave radio intensity setting process.

14. The image forming apparatus of claim 9, further comprising an operation panel configured to receive a forced execution instruction for executing the radio wave intensity setting process from a user, wherein the wireless communication unit executes the wave radio intensity setting process in accordance with the forced execution instruction received by the operation panel.

15. The image forming apparatus of claim 9, wherein when a reception of the print job is started, the wireless communication unit changes the set value according to a data size of the print job, and after the reception of the print job is finished, the wireless communication unit returns the set value to an original value.

16. The image forming apparatus of claim 9, further comprising a power saving controller configured to change a power mode between a normal mode and a power saving mode in which a power consumption is suppressed more than the normal mode, wherein the wireless communication unit executes the radio wave intensity setting process in the power saving mode, and when the power mode is changed from the power saving mode to the normal mode by receiving the print job, the wireless communication unit changes the set value to the predetermined radio wave intensity or changes the set value according to a data size of the print job.

17. A terminal device, comprising a processor configured to control a first wireless communication unit to transmit a print job to an image forming apparatus, the image forming apparatus comprising a second wireless communication unit which functions as an access point, and a printer configured to execute the print job received by the second wireless communication unit from an external terminal device, wherein the second wireless communication unit executes a wave radio intensity setting process in which the second wireless communication unit transmits a received signal intensity request at a predetermined radio wave intensity, receives information which is transmitted as a response to the received signal intensity request from each terminal device receiving the received signal intensity request and which indicates a received signal intensity at a timing of receiving the received signal intensity request, and sets a radio wave intensity of a radio wave to be transmitted by the second wireless communication unit to a set value which is lowered within a range in which the image forming apparatus is communicable with the terminal device in which the received signal intensity indicated in the information is lowest; and the processor being further configured to control the first wireless communication unit to transmit the information indicating the received signal intensity at the timing of receiving the received signal intensity request in case that the terminal device receives the received signal intensity request from the image forming apparatus, wherein the processor is configured to control the first wireless communication unit to transmit an execution instruction for executing the wave radio intensity setting process to the image forming apparatus, wherein the terminal device monitors the received signal intensity, and in case that the received signal intensity is lower than a predetermined allowable minimum value, the terminal device transmits the execution instruction to the image forming apparatus, wherein the second wireless communication unit repeatedly executes the wave radio intensity setting process at a time interval, and wherein in case that the set value which is set in the wave radio intensity setting process is less than a predetermined value, the second wireless communication unit sets the time interval so as to be shorter than the time interval which is set in case that the set value is not less than the predetermined value.

18. A terminal device, comprising a processor configured to control a first wireless communication unit to transmit a print job to an image forming apparatus, the image forming apparatus comprising a second wireless communication unit which functions as an access point, and a printer configured to execute the print job received by the second wireless communication unit from an external terminal device, wherein the second wireless communication unit executes a wave radio intensity setting process in which the second wireless communication unit transmits a received signal intensity request at a predetermined radio wave intensity, receives information which is transmitted as a response to the received signal intensity request from each terminal device receiving the received signal intensity request and which indicates a received signal intensity at a timing of receiving the received signal intensity request, and sets a radio wave intensity of a radio wave to be transmitted by the second wireless communication unit to a set value which is lowered within a range in which the image forming apparatus is communicable with the external terminal device in which the received signal intensity indicated in the information is lowest; and the processor being further configured to control the first wireless communication unit to transmit the information indicating the received signal intensity at the timing of receiving the received signal intensity request in case that the external terminal device receives the received signal intensity request from the image forming apparatus, wherein the processor is configured to control the first wireless communication unit to transmit an execution instruction for executing the wave radio intensity setting process to the image forming apparatus, and wherein in case that the terminal device receives a predetermined operation from a user, the terminal device transmits the execution instruction to the image forming apparatus, wherein the second wireless communication unit repeatedly executes the wave radio intensity setting process at a time interval, and wherein in case that the set value which is set in the wave radio intensity setting process is less than a predetermined value, the second wireless communication unit sets the time interval so as to be shorter than the time interval which is set in case that the set value is not less than the predetermined value.

19. A non-transitory computer-readable recording medium storing a program, wherein the program causes an information processing apparatus to execute:

transmitting a print job to an image forming apparatus, the image forming apparatus comprising a wireless communication unit which functions as an access point, the wireless communication unit configured to communicate with a plurality of external terminal devices, and a printer configured to execute the print job received by the wireless communication unit from an external terminal device of the plurality of external terminal devices, wherein the wireless communication unit executes a wave radio intensity setting process in which the wireless communication unit transmits a received signal intensity request at a predetermined radio wave intensity, receives information which is transmitted as a response to the received signal intensity request from each external terminal device of the plurality of external terminal devices receiving the received signal intensity request and which indicates a received signal intensity at a timing of receiving the received signal intensity request, and sets a radio wave intensity of a radio wave to be transmitted by the wireless communication unit to a set value which is lowered within a range in which the image forming apparatus is communicable with one external terminal device of the plurality of external terminal devices in which the received signal intensity indicated in the information is lowest; and transmitting the information indicating the received signal intensity at the timing of receiving the received signal intensity request in case that the information processing apparatus receives the received signal intensity request from the image forming apparatus, wherein the wireless communication unit of the image forming apparatus repeatedly executes the wave radio intensity setting process at a time interval, and in case that the set value which is set in the wave radio intensity setting process is less than a predetermined value, the wireless communication unit of the image forming apparatus sets the time interval so as to be shorter than the time interval which is set in case that the set value is not less than the predetermined value.

20. The non-transitory computer-readable recording medium of claim 19, wherein the program causes the information processing apparatus to transmit an execution instruction for executing the wave radio intensity setting process to the image forming apparatus.

21. The non-transitory computer-readable recording medium of claim 20, wherein the program causes the information processing apparatus to monitor the received signal intensity, and wherein in case that the received signal intensity is lower than a predetermined allowable minimum value, the program causes the information processing apparatus to transmit the execution instruction to the image forming apparatus.

22. The non-transitory computer-readable recording medium of claim 20, wherein in case that the information processing apparatus receives a predetermined operation from a user, the program causes the information processing apparatus to transmit the execution instruction to the image forming apparatus.

* * * * *